Sept. 30, 1969    W. B. BORST, JR    3,469,949
ALKYLATION APPARATUS FORMING AN UPWARDLY
SPIRALLING FLOW PATH OF REACTANTS
Filed Sept. 23, 1966

INVENTOR:
William B. Borst, Jr.

BY: James R. Hoatson, Jr.
    Joseph E. Mason, Jr.
    ATTORNEYS

United States Patent Office 3,469,949
Patented Sept. 30, 1969

3,469,949
ALKYLATION APPARATUS FORMING AN UP-
WARDLY SPIRALLING FLOW PATH OF
REACTANTS
William B. Borst, Jr., Mount Prospect, Ill., assignor to
Universal Oil Products Company, Des Plaines, Ill., a
corporation of Delaware
Filed Sept. 23, 1966, Ser. No. 581,600
Int. Cl. B01j 1/00
U.S. Cl. 23—285                                    4 Claims

ABSTRACT OF THE DISCLOSURE

An apparatus for carrying out an alkylation reaction is provided. The apparatus embodies a shell and tube heat exchanger wherein at least part of the tubes of the heat exchanger carry the hydrocarbon feed reactant into the space between the tubes and the shell for reaction by passing these reactants through a series of spaced openings in the tubes which jet the reactants into an upwardly spiraling flow path from the opening around the heat exchanger tubes into a moving flow path of hydrogen fluoride catalyst which has been passed into the shell side of the exchanger.

Figure 2:
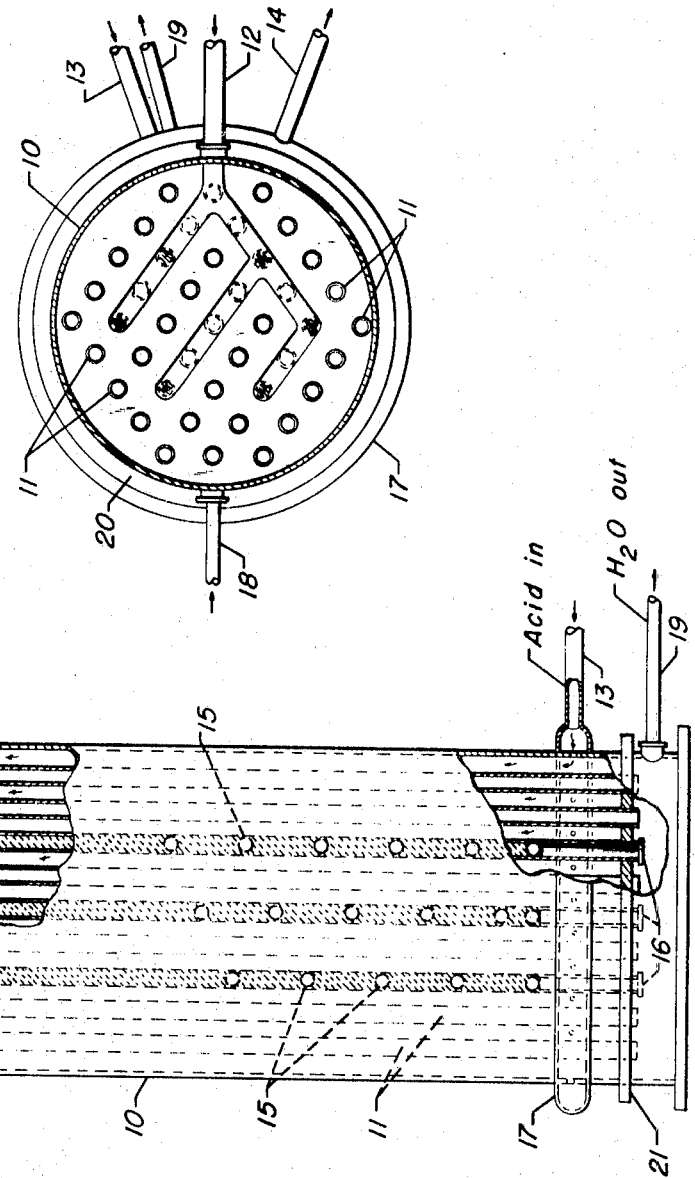

This invention relates to a catalytic alkylation process and apparatus for carrying out the alkylation reaction. It particularly relates to an improved process and apparatus for the production of an isoparaffin-olefin reaction product. It specifically relates to a process and apparatus for the alkylation of an isobutane stream with a butylene stream using hydrofluoric acid (HF) as the catalyst.

Production of higher molecular weight isoparaffins having valuable antiknock properties as motor fuel, is of considerable importance in the petroleum refining industry. Furthermore, the introduction of automobile engines of high compression ratio has necessitated the utilization of high antiknock fuel in these engines to obtain efficiency therefrom. Thus, the demand for higher and higher octane number fuels has led to the increased use of higher molecular weight isoparaffins as blending agents in gasoline.

A convenient source of such higher molecular weight isoparaffins is the catalytic alkylation of low boiling isoparaffins, such as isobutane, with olefin hydrocarbons, such as, for example, propylene, the butylenes, the amylenes, and various mixtures thereof.

It is well known in the prior art that catalytic alkylation using, for example, hydrofluoric acid as the catalyst, has become an important chemical tool for preparing alkylated hydrocarbons and derivatives thereof. The prior art process of alkylation generally is effected by contacting an isoparaffin hydrocarbon feedstock with olefin hydrocarbon feedstock in the presence of a catalyst, such as hydrofluoric acid, in a typical reaction vessel for conducting chemical reactions.

In practice, there have been numerous process schemes advanced by the prior art for accomplishing the alkylation reaction, but it is extremely difficult to achieve a process scheme which embodies all of the desirable features of a completely optimum reaction. Optimizing the alkylation reaction is complicated by the fact that the alkylation reaction, if not carried out properly, has many side reactions, such as polymerization, which destroy the effectiveness of the reaction and inhibits the production of commercial quantities of desired alkylates. Additionally, the reaction, in order to be carried out commercially, requires a tremendous amount of auxiliary equipment for the recovery of the alkylate product and for the regeneration and reuse of the excess catalyst and excess reactants which have passed through the reaction system.

A particular difficulty with the alkylation reaction as practiced by those skilled in the art, is that the reaction itself effects a rapid evolution of heat which causes local overheating within a typical reaction vessel. Such local overheating is injurious to the quality of the alkylate produced and in some cases is injurious to the yield of the alkylate produced. Therefore, it is highly desirable to effect a reaction vessel which has the ability of removing the exothermic heat of reaction as rapidly as possible in order to avoid localized overheating. Another important difficulty with the alkylation reaction is that the catalyst and reactants are substantially immiscible fluids. Accordingly, to optimize the reaction requires that optimum mixing of the catalyst and reactants be arranged. It follows, therefore, that another desirable feature of a reaction vessel is to provide means for intimately mixing two substantially immiscible fluids while simultaneously providing control over the reaction, such as by removing the exothermic heat of reaction as rapidly and efficiently as possible.

Therefore, it is an object of this invention to provide a process for carrying out a catalytic alkylation reaction.

It is also an object of this invention to provide apparatus for carrying out a catalytic alkylation reaction in a more facile and economical manner.

It is another object of this invention to provide an alkylation process wherein hydrogen fluoride is used as the catalyst.

It is still another object of this invention to provide a process and apparatus for producing an isobutane-olefin reaction product in a more facile and economic manner than has heretofore been achieved.

The present invention has both apparatus and process aspects. According to the present invention, the apparatus aspect comprises in combination a vertically disposed, substantially cylindrical shell having a plurality of tubular heat exchange means longitudinally and uniformly spaced within said shell; first inlet means to said shell; outlet means from said shell; second inlet means comprising at least one conduit extending into said shell and passing vertically in parallel and spaced relationship with said heat exchange means; and perforate means through said second inlet conduit only over a portion of its length providing communication into said shell between said tubular means.

In other words, the apparatus aspect of the present invention embodies a shell and tube heat exchanger wherein at least part of the tubes of the heat exchanger carry the hydrocarbon feed reactant into the space between the tubes and the shell for reaction, by passing the reactants through a series of spaced orifice-type holes in the tubes which jet the reactant into a moving flow path of catalyst which has been passed into the shell side of the exchanger.

In accordance of the process aspects of the present invention, it provides a process for producing alkylated hydrocarbons which comprises the steps of admixing an olefin feed reactant with an isoparaffin feed reactant; passing said admixture into a reaction zone, comprising at least one vertically disposed vessel having tubular heat exchange means integrally associated therein, through a plurality of perforations in at least one conduit positioned vertically in spaced, adjacent relationship with said heat exchange means; introducing catalyst in liquid phase into the annulus of said heat exchange means at one end thereof under conditions sufficient to effect reaction between said reactants thereby creating an upwardly spiralling flow path of alkylated hydrocarbons around said heat exchange means; withdrawing from the other end of said zone a reaction effluent comprising alkylated hydrocarbons, unreacted isoparaffin reactant, and catalyst; passing the effluent into the uppermost compartment of a multi-compartmented, vertically disposed vessel comprising at least one uppermost compartment for settling said effluent and a lower compartment for storing fresh catalyst, each said compartment being located at an elevation above the reaction zones; maintaining in said uppermost compartment conditions such that said effluent separates into a predominantly hydrocarbon phase containing alkylated hydrocarbons and a predominantly catalyst phase; withdrawing from the uppermost compartment said hydrocarbon phase and said catalyst phase as separate streams; and, returning catalyst phase by gravity flow to said reaction zone as in step (c) without intervening cooling thereof.

It can be seen, therefore, that the present invention embodies the concept of a shell and tube heat exchanger for the design of an alkylation reactor whereby some of the tubes provide cooling and other tubes provide a means for introducing the feed reactant into a bath or heat sink of catalyst whereby excellent control over the reaction temperature is achieved and excellent efficiency of reaction is achieved through intimate mixing of the reactants and catalyst.

As stated hereinabove, this invention relates to an improved process and apparatus for the production of an isoparaffin-olefin reaction product. Although the present process is particularly applicable to the alkylation of an isobutane hydrocarbon with a butylene hydrocarbon, it is also applicable to other isoparaffinic and other olefinic hydrocarbon feedstocks. Thus, other paraffinic hydrocarbons, such as isopentane, one or more of the isoheptanes, or mixtures of the aforementioned isoparaffin branched-chain heptanes and other aliphatic hydrocarbons of branched-type and chain structure may be utilized as feedstock. Similarly, as olefinic hydrocarbon reactants, the normally gaseous olefin hydrocarbon, including propylene, 1-butylene, 2-butylene, isobutylene, the isomeric amylenes, the hexenes, the heptenes, and higher molecular weight olefinic hydrocarbons, may be utilized as olefin hydrocarbon reactant in the inventive process.

The alkylation reaction occurs at temperatures from 0° F. to about 200° F., preferably from about 30° F. to about 110° F. Generally, the heat of reaction must be removed from the reactor; therefore, heat exchange means, such as an internal cooler or heat exchanger, is commonly employed within the reactor itself. The pressure on the alkylation system is ordinarily just high enough to maintain the hydrocarbon and catalyst in substantially liquid phase. In other words, the reactor, or apparatus aspect of the present invention, provides a means for effecting the mixing of two liquid immiscible fluids. Suitable pressures would range, therefore, from about atmospheric to about 40 atmospheres or more. Typically, the pressure will be in the range of about 200 p.s.i.g. for the case of butylene alkylation with isobutane. The contact time in the alkylation reactor conveniently will be less than 5 minutes and preferably less than about 2 minutes.

The alkylation reaction is conducted in the presence of a catalyst such as hydrogen fluoride, generally in an amount sufficient to provide a catalyst-to-hydrocarbon volume ratio in the alkylation reactor of about 0.5 to about 2.5. Similarly, in order to reduce the tendency of the olefinic portion of the feed mixture to undergo polymerization prior to alkylation, the molar proportion of isoparaffin hydrocarbon to olefin hydrocarbon in the alkylation reactor is generally maintained at a value greater than 1 up to about 20:1, preferably from about 3:1 to about 15:1.

It is to be noted from the description of the present invention that the reactor design is of a tubular type, that is, it is a shell housing a series of tubes running between an upper and lower tube sheet. It is evident that with this arrangement the distribution of the two immiscible fluids becomes extremely important. A "spider" arrangement is not applicable since such a distribution means cannot be physically inserted into a reactor of a tubular type. The prior art has attempted to overcome the difficulties in reactor design by developing processing schemes whereby the catalyst and hydrocarbon reactants are brought together in a mixing zone which has external cooling means, using eductors for mixing and heat transfer, or using multiple feed inlets into the reactor so that localized overheating might be involved. In each of these prior art schemes the methods for controlling the temperature within the reactor have generally been unsatisfactory.

Accordingly, it is noted that the present invention provides for the mixing of the hydrocarbon reactant and catalyst in an upwardly spiralling flow path from the orifice-type opening. The flow path circles around the heat exchange tubes thereby effecting control at the point of heat evolution of the temperatures. Such an arrangement, of course, keeps local overheating to a minimum and decreases the amount of heat sink needed for circulation, thereby significantly decreasing the operating costs of the system.

The invention, both in its apparatus aspects and in its process aspects, is uniquely applicable to the system whereby the settled acid from a conventional acid settler is returned to the reaction zone by gravity flow or in an uninhibited free-flowing manner. Since complicated mixing devices have been eliminated, the pressure drop through the reactor is at a minimum thereby decreasing the necessity for pumps, valves, and so forth, for controlling the flow of the acid into the reactor. Obviously, the elimination of pumps, flanges, and valves also eliminates the danger of acid leakage and spillage thereby increasing the safety aspects of the alkylation reaction. The apparatus of the present invention also may embody suitable baffle means for increasing heat transfer coefficients and suitable tube support means.

The design of the alkylation reactor is not of itself particularly critical. Conventionally, the tubes running between the tube sheets are nominally one inch in diameter tubes and, for example, may be up to 20 feet in length or longer. For a 1 inch diameter tube, the perforations or orifice-type openings which are placed in the feed tubes would be placed in a spiral manner along the length of the individual tube with an orifice appearing every ½ to 6 inches, preferably about 2 inches apart. The diameters of the holes, or orifices, may range from $1/16$ inch to $3/16$ inch, preferably approximately ⅛ inch in diameter for the 1 inch diameter tube size. Those skilled in the art will know how to tailor the distance between the holes and the diameter of the holes to obtain an optimum result for a particular reactor design. It is important, however, that the configuration of the holes be designed such that the hydrocarbon reactants are jetted into the catalyst sink at a velocity through the holes in the range from 5 to 55 feet per second, preferably in a range above 30 feet per second. Additionally, the geometry of the holes should be such that there is no impingement of the hydrocarbon reactants against an adjacent heat exchange tube. A convenient way of specifying the latter requirement is that no opening or orifice occurs in the hydrocarbon conduit in line-of-sight with a respective adjacent heat exchange tube.

Since the alkylation reaction is relatively rapid in terms of time, the present invention is satisfactorily operated if the orifice openings are placed in the feed tubes over a length of no more than 75% of the total length of the tube in contact with the acid phase as measured from the entry locus for the acid.

A particular embodiment of the apparatus aspect of the invention relates to apparatus comprising in combination: a vertically disposed enclosed shell; a plurality of tubular heat exchange means extending longitudinally between and through upper and lower tube sheets and uniformly spaced within said shell; first inlet means into the lower portion of the space between said tube sheet; outlet means communicating with the upper portion of said space; and second inlet means comprising a plurality of conduits extending longitudinally between said tube sheets and spaced in adjacent, parallel relationship to said heat exchange means, said conduits having orifice openings longitudinally spaced in spiral manner therein.

Another embodiment of the apparatus aspect of the present invention includes a distribution means which comprises circumferential conduit external of said shell and having a plurality of ports communicating with said lower portion at loci along substantially the entire circumference thereof. In other words, the distribution means contemplated by the present invention includes a conduit ringing the lower portion of the reactor shell whereby orifice openings or ports are placed through the ring through the reactor shell into the shell side of the reactor. These ports are placed approximately equidistant apart and provide for the injection of fluid radially into the space between the heat exchange tubes and the reactor shell over substantially the entire circumference of the reactor shell. It was found that this provided excellent distribution of the catalyst throughout the reaction zone. It is also contemplated by the present invention that a similar distribution means be placed at the outlet means from the reaction zone as a means for withdrawing the total effluent from the reaction zone in a uniform manner.

From the description presented hereinabove, a specific embodiment for the process aspects of this invention includes the process for the production of isobutane-olefin reaction product which comprises: commingling an olefin feed reactant with isobutane to form an alkylation feed mixture comprising an isobutane-to-olefin molar ratio from 1:1 to 20:1; introducing said feed mixture into an elongated reaction zone comprising a shell having tubular heat exchange means longitudinally and uniformly disposed therein, through a plurality of conduits positioned vertically in adjacent, parallel relationship with said heat exchange means, said conduits having orifice openings in equispaced, spiral manner along the longitudinal periphery thereof, adapted to pass said mixture into the space between the heat exchange tubes and the shell of said zone at a velocity from 5 to 55 feet per second; passing hereinafter specified hydrogen fluoride catalyst into said space through one end of the reaction zone thereby creating an upwardly spiralling flow path of alkylated hydrocarbons around said heat exchange means; reacting said feed mixture in the presence of said catalyst under alkylation conditions including a catalyst-to-hydrocarbon volume ratio from 0.5 to 2.5, sufficient to produce isobutane-olefin reaction products; removing a total effluent stream comprising said reaction product and said catalyst; passing said total effluent into the uppermost compartment of a multi-compartmented, vertically disposed vessel comprising at least an uppermost compartment for settling said effluent and a lower compartment for storing fresh catalyst, each said compartment being located at an elevation above the reaction zone; maintaining in said uppermost compartment conditions such that said effluent separates into a hydrocarbon phase containing said reaction product and a hydrogen fluoride catalyst phase; withdrawing from the uppermost compartment said hydrocarbon phase and said catalyst phase as separate streams, and returning catalyst phase in uninhibited, free-flowing manner to said reaction zone without intervening cooling thereof.

The objects and advantages of the present invention will be more clearly understood from the description below with reference to the annexed drawing of which—

Figure 1:
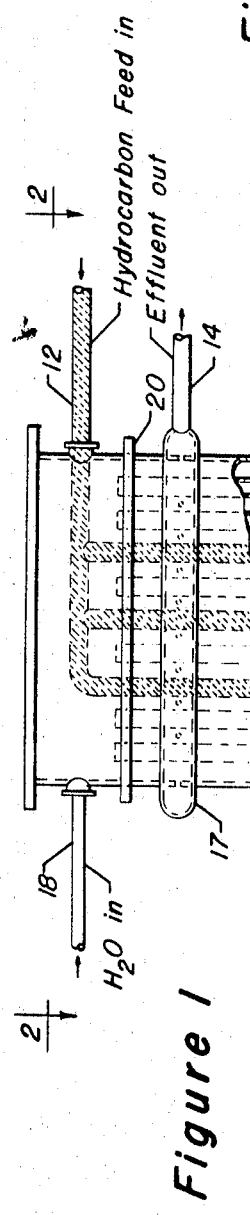

FIGURE 1 is a diagrammatic representation of the apparatus for practicing the invention, and FIGURE 2 is a sectional view of one arrangement of the tubes within the reactor shell as mentioned hereinabove.

Referring now to the annexed drawing of FIGURE 1, an olefin-containing feedstock is commingled with an isoparaffin feedstock to form an alkylation feed mixture in line 12. The alkylation feed mixture is passed from line 12 into reactor 10 through a plurality of conduits 15 which are placed in adjacent, parallel relationship with heat exchange tube 11. It is noted that all of the tubes run between tube sheets 20 and 21. The hydrocarbon feed tubes are perforated at the lower end thereof in order to distribute the feed in a spiral zone preferably in the lower two-thirds of the reactor. The feed hydrocarbon tubes 15 may be conventional tubes having plug 16 therein and fastened to tube sheet 21 in conventional manner by means well known to those skilled in the art.

Hydrofluoric acid catalyst enters one end of the reactor via line 13 and distribution means 17 which comprises a circumferential conduit placed in ring fashion around the external portion of the reactor 10 shell. Distributor 17 has a series of holes drilled through the conduit through the shell wall into the space between the tubes and the reactor shell for jetting the acid radially into such space. The acid phase passes upwardly filling the shell 10 and completely surrounding the heat exchange tubes and the feed inlet tubes 15. Cold water, in an amount sufficient to remove the heat of reaction evolved from the reaction, enters the reactor 10 via line 18 and exits reactor 10 via line 19. It is to be noted that at a point of the lowermost orifice opening in feed conduit 15, as feed contacts the catalyst the reaction occurs thereby evolving heat which is absorbed by the adjacent heat exchange tubes 11. By proceeding upwardly, a spiralling flow path of alkylated hydrocarbons swirls around the heat exchange tubes thereby effecting efficient removal of the heat of reaction and permitting excellent control over the reaction temperature.

A specific embodiment of the apparatus aspects of the invention may be more fully understood with reference to FIGURE 2 which is a cutaway section of reactor 10 and represents a top view. The hydrocarbon feed mixture enters through line 12 and is distributed through the tubes 15 which it can be seen run vertically in parallel, spaced relationship with the heat exchange tubes 11. It is preferably that the hydrocarbon feed conduits 15 be arranged in symmetrical manner with the heat exchange tubes. It is further preferred in the practice of the apparatus aspect of the invention that the holes in the conduit 15 are arranged so that the jetting effect of the hydrocarbons being propelled into the catalyst do not impinge on an adjacent heat exchange tube in either direction. The reason for this, of course, is to minimize the erosive and corrosive effect of an impingement action on the heat exchange tubes.

Again, referring to FIGURE 1, the combined reaction mixture is removed from reactor 10 via line 14 which also in this preferred embodiment includes a distribution means 17 as described hereinabove.

The particular details of the process aspects of the present invention have not been shown by means of a drawing since the flow of the effluent from a typical alkylation reactor is fairly well known to those skilled in the art. From a descriptive standpoint, the hydrocarbon and catalyst effluent from reactor 10 being withdrawn via line 14 is passed into the uppermost compartment of a stacked vessel comprising at least an uppermost compartment for settling the total effluent from the reactor and a lower compartment for storing fresh acid used in the process. Preferably, each of these compartments are placed at an elevation above the elevation of the reaction zone so that the hereinafter specified catalyst streams can be returned to the reaction zone by gravity flow in an uninhibited, free-flowing manner.

After the desired residence time in the uppermost compartment of the stacked vessel has been reached, the hydrocarbons and hydrogen fluoride catalyst separate into at least two distinct phases: an upper phase comprising alkylated hydrocarbons and a lower phase comprising catalyst. However, there is an interface disposed there-between. The hydrocarbons include the alkylation product now substantially free from hydrogen fluoride and are withdrawn from the uppermost compartment for processing through a downstream fractionation train in order to recover the unreacted hydrocarbons and to recover the desired alkylate product in substantially pure form.

The hydrogen fluoride catalyst which has been settled and separated is withdrawn from the uppermost compartment and recycled to the reactor via line 13 of FIGURE 1. A portion of the hydrogen fluoride catalyst removed from the settler can be passed to acid regeneration means for removal of tars and constant boiling mixture (CBM). The regenerated acid can also be returned to the reaction zone via line 13.

When operating a hydrogen fluoride alkylation unit in the manner hereinabove described utilizing the process and apparatus of the present invention, an alkylate product having and end point below 400° F. and an octane number (F–1+ 3 cc. of TEL per gallon of alkylate) of at least 105, is obtained with a hydrogen fluoride catalyst consumption of less than 0.2 pound of catalyst per barrel of alkylate produced. Additionally, significant economy of operation is achieved over the processing schemes taught by the prior art. The illustrative example presented hereinbelow will describe other advantages and explain more fully a specific mode of operation for the present invention.

EXAMPLE

A plant is operated in accordance withe the flow scheme of the attached drawing to produce 4740 barrels per stream day (b.p.s.d.) of 7 pound Reid vapor pressure alkylate having a research octane number of 3 ccs. TEL/gallon of 105 with a catalyst (hydrogen fluoride) consumption of less than 0.2 pound per barrel of alkylate produced.

An olefin feed reactant is commingled at a rate of 4220 b.p.s.d. in the following amounts:

| Component: | B.p.s.d. |
|---|---|
| Ethane | 7 |
| Propylene | 789 |
| Propane | 409 |
| Butylenes | 1491 |
| Isobutane | 918 |
| n-Butane | 357 |
| Amylenes | 150 |
| Isopentane | 99 |
| Total | 4220 | with an isoparaffin feed reactant of 4055 b.p.s.d. having the following components:

| Components: | B.p.s.d. |
|---|---|
| Propane | 182 |
| Isobutane | 2112 |
| n-Butane | 1694 |
| Isopentane | 67 |
| Total | 4055 | to form an alkylation feed mixture comprising 8275 b.p.s.d.

The alkylation feed mixture is mixed with 47,280 b.p.s.d. of isobutane recycle from means not shown on the drawing for a combined feed to the reactor of 55,555 b.p.s.d. This combined feed is charged to the reactor such that the velocity through the orifice openings is about 30 feet per second. Approximately 54,350 b.p.s.d. of hydrogen fluoride catalyst is also added to reactor.

The operating conditions in the reactor are as follows

| | |
|---|---|
| Isobutane to olefin mol ratio | 13 |
| Catalyst to hydrocarbon volume ratio | 1.0 |
| Reactor temperature, ° F. | 100 |
| Reactor pressure, p.s.i.g. | 217 |

The effluent from the reactor is passed to an elevated settler (located above the reactor) at a rate of 108,940 b.p.s.d. After settling and separation of the acid phase from the hydrocarbon phase 54,280 b.p.s.d. of hydrocarbon phase is removed from the settler for conventional processing to recover the isobutane for recycle and to remove the alkylate product having the quality previously mentioned.

The acid phase at a rate of 54,340 b.p.s.d. is removed from the settler and recycled to the reactor by gravity flow. No external pumping energy is used and the flow is uninhibited and free-flowing with no control valves or obstructions of any kind being in the return line. The flow of the acid from the settler is the result of the energy imparted by its elevation, aided by the difference in density between the acid phase and the total effluent from the reactor, and the energy imparted by the flowing hydrocarbons in the reactor which are pumped into the system. However, it is noted that there is no pump on the acid phase thereby increasing the safety and decreasing the maintenance cost for the operation.

A portion of the acid from the settler is passed to an acid regenerator (not shown) for removal of tars, etc. The purified acid from the regenerator and the acid subsequently recovered in the conventional fractionation train associated with the reactor is returned to the reactor to produce a total acid return stream of 54,350 b.p.s.d.

Reactor 10 is a shell reactor vessel having internal water cooling coils for removal of the heat of reaction. The inlet points are placed in the tubes so that the heat released by the reaction taking place in a flow path flowing upwardly is substantially removed by the cooling coils and by the heat sink of the total mass flowing through the reactor. In this manner, excellent control over the temperature in the reactor is achieved. The total duty on the cooler is approximately $14.62 \times 10^6$ B.t.u./hour.

The invention also contemplates the employment of any suitable catalyst material in addition to hydrofluoric acid as discussed hereinabove, such as sulfuric acid, mixtures of sulfuric acid and phosphoric acid, hydrofluoric acid, and certain complexes of aluminum chloride and boron chloride. It is distinctly preferable, however, in the practice of this invention to use hydrofluoric acid, or hydrogen fluoride, as the catalytic mass. As used herein, the term "hydrogen fluoride catalyst" is intended to include catalyst wherein hydrogen fluoride is the essential active ingredient. Thus, it is within the scope of this invention to employ substantially anhydrous hydrogen fluoride or hydrofluoric acid or hydrogen fluoride, containing various additives or promoters, such as boron trifluoride. Ordinarily, commercial hydrogen fluoride will be charged to the alkylation system as fresh catalyst. However, it is possible to use hydrogen fluoride containing as much as about 10% by volume water or more. Excessive dilution with water is generally undesirable since it tends to reduce the alkylating activity of the catalyst and introduces corrosion problems into the apparatus for effecting the alkylation.

Additional modifications may be made to the apparatus of the present invention by those skilled in the art without departing from the scope of the invention. For example, it is within the scope of this invention to use any conventional manner of placing the tubes within the shell. The tubes may be placed such that the cooling medium is in one end of the tube and out the other end, or a typical U turn heat exchange means may be used with satisfactory results. The present invention is not to be limited by any manner of manifolding the feed inlet system and the heat exchange cooling means into the alkylation reactor.

What I claim is:

1. Apparatus comprising in combination: a vertically disposed, enclosed shell having a tube sheet spaced from each end of the shell defining a space between each tube sheet and said shell; a plurality of tubular heat exchange means supported at each end by a tube sheet, said heat exchange means uniformly spaced within said shell and extending longitudinally in the space between said tube sheets and through each tube sheet in fluid communication with said space between said tube sheet and said shell; first inlet means extending into a lower portion of the space between said tube sheets; outlet means communicating with the upper portion of said space; and second inlet means connected to a plurality of conduits which extend longitudinally between said tube sheets and are spaced in adjacent, parallel relationship to said heat exchange means, said conduits having a plurality of openings longitudinally spaced in each of said conduits and arranged therein to form a series of consecutively advancing openings with each adjacent conduit whereby a fluid discharged from said openings forms a spiraling flow path.

2. Apparatus according to claim 1 wherein said first inlet means includes distribution means comprising circumferential conduit external of said shell and having a plurality of ports communicating with said lower portion at loci along substantially the entire circumference thereof.

3. Apparatus according to claim 2 wherein said openings occur over less than 75% of the length of said conduit as measured from the locus of said first inlet means.

4. Apparatus according to claim 1 wherein said openings are from $1/16$ inch to $3/16$ inch diameter, are spaced from $1/2$ inch to 6 inches apart, and are spaced such that no opening occurs in line-of-sight with respective adjacent heat exchange tube.

References Cited

UNITED STATES PATENTS

| | | | |
|---|---|---|---|
| 2,454,869 | 11/1948 | Goldsby et al. | 260—683.48 X |
| 2,459,636 | 1/1949 | Fenney | 260—683.57 |
| 2,463,262 | 3/1949 | Goldsby | 260—683.57 |
| 2,603,591 | 7/1952 | Evans | 260—683.43 |
| 2,937,079 | 5/1960 | Van Pool | 260—683.48 |

DELBERT E. GANTZ, Primary Examiner

G. T. CRASANAKIS, Assistant Examiner

U.S. Cl. X.R.

23—288; 260—683.48